(12) United States Patent
Abe et al.

(10) Patent No.: US 10,351,091 B2
(45) Date of Patent: Jul. 16, 2019

(54) OCCUPANT'S LEG RESTRAINT DEVICE AND AIRBAG FOR OCCUPANT'S LEG RESTRAINT DEVICE

(71) Applicant: TAKATA CORPORATION, Tokyo (JP)

(72) Inventors: Kazuhiro Abe, Shiga (JP); Norihisa Okada, Shiga (JP)

(73) Assignee: TAKATA CORPORATION, Tokyo (JP)

( * ) Notice: Subject to any disclaimer, the term of this patent is extended or adjusted under 35 U.S.C. 154(b) by 43 days.

(21) Appl. No.: 15/504,265

(22) PCT Filed: May 26, 2015

(86) PCT No.: PCT/JP2015/065072
§ 371 (c)(1),
(2) Date: Feb. 15, 2017

(87) PCT Pub. No.: WO2016/027543
PCT Pub. Date: Feb. 25, 2016

(65) Prior Publication Data
US 2017/0232920 A1 Aug. 17, 2017

(30) Foreign Application Priority Data
Aug. 20, 2014 (JP) ................................. 2014-167641

(51) Int. Cl.
*B60R 21/206* (2011.01)
*B60R 21/233* (2006.01)
(Continued)

(52) U.S. Cl.
CPC .......... *B60R 21/206* (2013.01); *B60R 21/233* (2013.01); *B60R 21/239* (2013.01);
(Continued)

(58) Field of Classification Search
CPC ............................ B60R 21/206; B60R 21/233
See application file for complete search history.

(56) References Cited

U.S. PATENT DOCUMENTS

| | | | | |
|---|---|---|---|---|
| 6,685,217 B2 * | 2/2004 | Abe | ...................... | B60R 21/206 280/729 |
| 7,549,672 B2 * | 6/2009 | Sato | ...................... | B60R 21/207 280/729 |

(Continued)

FOREIGN PATENT DOCUMENTS

| | | | | |
|---|---|---|---|---|
| DE | 102011053863 A1 * | 3/2013 | ........... | B60R 21/206 |
| JP | 2005096576 A | 4/2005 | | |

(Continued)

OTHER PUBLICATIONS

International Search Report dated Oct. 6, 2015 for PCT/JP2015/065072 and English translation of the same. (4 pages).

*Primary Examiner* — Nicole T Verley
(74) *Attorney, Agent, or Firm* — Fitch, Even, Tabin & Flannery LLP

(57) ABSTRACT

Provided is an occupant's leg restraint device suitable for restraining the legs of an occupant when an automobile has an oblique collision or an offset barrier collision. The occupant's leg restraint device has an airbag and an inflator for supplying gas to the lower part of the airbag to inflate the airbag, and the airbag has a first panel on the occupant side and a second panel on the side opposite thereto. An upper part of the inside of the airbag is divided into small chambers by vertical separating panels that are joined to the first panel and the second panel and that extend vertically. In a state where the airbag has inflated, recessed portions having a depth of 20 to 40 mm are formed in the occupant-side surface of the airbag along the vertical separating panels.

6 Claims, 5 Drawing Sheets

(51) Int. Cl.
  *B60R 21/2334*  (2011.01)
  *B60R 21/239*  (2006.01)
  *B60R 21/00*  (2006.01)
  *B60R 21/231*  (2011.01)

(52) U.S. Cl.
  CPC .. *B60R 21/2334* (2013.01); *B60R 2021/0051* (2013.01); *B60R 2021/0053* (2013.01); *B60R 2021/23169* (2013.01); *B60R 2021/23176* (2013.01); *B60R 2021/23308* (2013.01); *B60R 2021/23324* (2013.01)

(56) References Cited

U.S. PATENT DOCUMENTS

| | | | | |
|---|---|---|---|---|
| 7,604,252 | B2* | 10/2009 | Heitplatz | B60R 21/206 |
| | | | | 280/729 |
| 7,661,700 | B2* | 2/2010 | Imamura | B60R 21/203 |
| | | | | 280/730.1 |
| 7,954,845 | B2* | 6/2011 | Moritani | B60R 21/206 |
| | | | | 280/730.1 |
| 8,029,016 | B2* | 10/2011 | Moritani | B60R 21/233 |
| | | | | 280/730.1 |
| 8,272,667 | B2* | 9/2012 | Schneider | B60R 21/206 |
| | | | | 280/728.2 |
| 8,292,323 | B2* | 10/2012 | Matsushima | B60R 21/231 |
| | | | | 280/730.1 |
| 8,376,396 | B2* | 2/2013 | Miller | B60R 21/206 |
| | | | | 280/729 |
| 8,393,636 | B2* | 3/2013 | Tanaka | B60R 21/206 |
| | | | | 280/729 |
| 8,696,020 | B2* | 4/2014 | Tanaka | B60R 21/233 |
| | | | | 280/728.2 |
| 8,770,617 | B2* | 7/2014 | Abele | B60R 21/2338 |
| | | | | 280/730.1 |
| 9,598,044 | B2* | 3/2017 | Fujiwara | B60R 21/233 |
| 2002/0149187 | A1* | 10/2002 | Holtz | B60R 21/206 |
| | | | | 280/749 |
| 2007/0200321 | A1 | 8/2007 | Heitplatz et al. | |
| 2009/0085333 | A1* | 4/2009 | Imaeda | B60R 21/2032 |
| | | | | 280/730.1 |
| 2013/0020787 | A1 | 1/2013 | Abele et al. | |
| 2016/0355152 | A1* | 12/2016 | Perez Garcia | B60R 21/36 |
| 2017/0057447 | A1* | 3/2017 | Ando | B60R 21/233 |
| 2017/0174172 | A1* | 6/2017 | Burczyk | B60R 21/233 |

FOREIGN PATENT DOCUMENTS

| | | | | |
|---|---|---|---|---|
| JP | 3772742 | B2 | 5/2006 | |
| JP | 3868227 | B2 | 1/2007 | |
| JP | 2007-55608 | A | 3/2007 | |
| JP | 4063168 | B2 | 3/2008 | |
| JP | 4140494 | B2 * | 8/2008 | ........... B60R 21/203 |
| JP | 2009101758 | A * | 5/2009 | ........... B60R 21/206 |
| JP | 2009-149236 | A | 7/2009 | |
| JP | 2010-52669 | A | 3/2010 | |
| JP | 2012030716 | A * | 2/2012 | ........... B60R 21/233 |
| JP | 4954003 | B2 * | 6/2012 | |
| JP | 6217047 | B2 * | 10/2017 | |
| WO | 2013/054397 | A1 | 4/2013 | |
| WO | WO-2016027543 | A1 * | 2/2016 | ........... B60R 21/206 |

\* cited by examiner

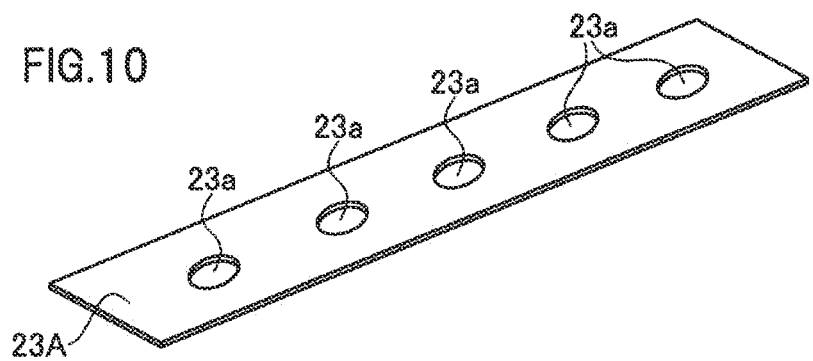

OCCUPANT'S LEG RESTRAINT DEVICE AND AIRBAG FOR OCCUPANT'S LEG RESTRAINT DEVICE

CROSS-REFERENCE TO RELATED APPLICATIONS

This application is a U.S. National Phase Patent Application of International Patent Application Number PCT/JP2015/065072, filed on May 26, 2015, which claims priority of Japanese Patent Application Number 2014-167641, filed Aug. 20, 2014, which are hereby incorporated herein by reference in their entirety.

TECHNICAL FIELD

The present invention relates to an occupant's leg restraint device for restraining a leg of an occupant during an automobile collision, and more specifically, it relates to an occupant's leg restraint device that restrains a leg of an occupant in a front seat with an airbag. The present invention also relates to an airbag used in the occupant's leg restraint device.

BACKGROUND ART

An airbag for an occupant's leg restraint device includes an airbag that inflates in front of legs of an occupant in a front seat (a driver seat or a passenger seat) to restrain the legs of the occupant at an automobile collision. The airbag includes a first panel on the occupant side and a second panel on the instrument panel side that are sewn together. PTLs 1 to 3 disclose an airbag in which a first panel and a second panel are connected by tethers made of fabric to limit the inflated thickness of the airbag.

In the airbag of PTLs 1 to 3, the tethers extend in the lateral direction of the vehicle body (hereinafter simply referred to as "lateral direction"), and a chamber that is continuous from the left end side to the right end side of the airbag is formed in the uppermost part of the airbag.

PTL 1: Japanese Unexamined Patent Application Publication No. 2002-337642
PTL 2: Japanese Unexamined Patent Application Publication No. 2003-182504
PTL 3: Japanese Unexamined Patent Application Publication No. 2005-29102

SUMMARY OF INVENTION

It is an object of the present invention to provide an occupant's leg restraint device and an airbag for an occupant's leg restraint device that are suitable for restraining a leg of an occupant when an automobile has an oblique collision or an offset barrier collision.

The occupant's leg restraint device of the present invention comprises an airbag that inflates in front of legs of an occupant in a front seat of an automobile; and an inflator for supplying gas to the lower part of the airbag to inflate the airbag. The airbag has a first panel on an occupant side and a second panel on a side opposite thereto. An upper part of an inside of the airbag is divided into four or more small chambers by vertical separating panels that are joined to the first panel and the second panel and that extend vertically.

It is preferable that, in a state where the airbag has inflated, the lower ends of the vertical separating panels are located about midway between an knee and an ankle of an AM50 dummy.

The number of the small chambers is preferably 4 to 6.

It is preferable that, below the small chambers, there is a continuous chamber that is continuous from the left end side to the right end side of the airbag.

The small chambers and the continuous chamber are preferably separated by a horizontal separating panel extending in the lateral direction of the airbag, and gas can flow from the continuous chamber into the small chambers through openings provided in the horizontal separating panel.

It is preferable that, in a state where the airbag has inflated, recessed portions having a depth of 20 to 40 mm are formed in the occupant-side surface of the airbag along the vertical separating panels.

An airbag used in an occupant's leg restraint device of the present invention comprises a first panel on the occupant side and a second panel on the side opposite thereto. An upper part of an inside of the airbag is divided into four or more small chambers by vertical separating panels that are joined to the first panel and the second panel and that extend vertically.

When an automobile equipped with the occupant's leg restraint device of the present invention has a collision, the airbag inflates and deploys in front of an occupant, and the legs of the occupant are restrained. When an automobile has an oblique collision or an offset barrier collision, a leg, particularly a knee of an occupant start moving diagonally forward. An upper part of the inside of the airbag of the present invention is divided into four or more small chambers by vertical separating panels. A thickness of the airbag at the vertical separating panel is smaller than the maximum thickness of the small chambers, and recessed portions extending vertically are formed in the occupant-side surface of the airbag. Because the legs of the occupant engage with the recessed portions, the airbag restrains the knees of the occupant to move forward diagonally.

In the present invention, because a continuous chamber that is continuous from the left end side to the right end side of the airbag is formed below the small chambers, the airbag inflates quickly in the lateral direction.

When a horizontal separating panel that separates the small chambers and the continuous chamber is provided with openings so that gas flows from the continuous chamber into the small chambers, the inflation of each small chamber is equalized.

BRIEF DESCRIPTION OF DRAWINGS

FIG. 10 is a perspective view showing another example of a horizontal separating panel.

DESCRIPTION OF EMBODIMENTS

Figure 1:
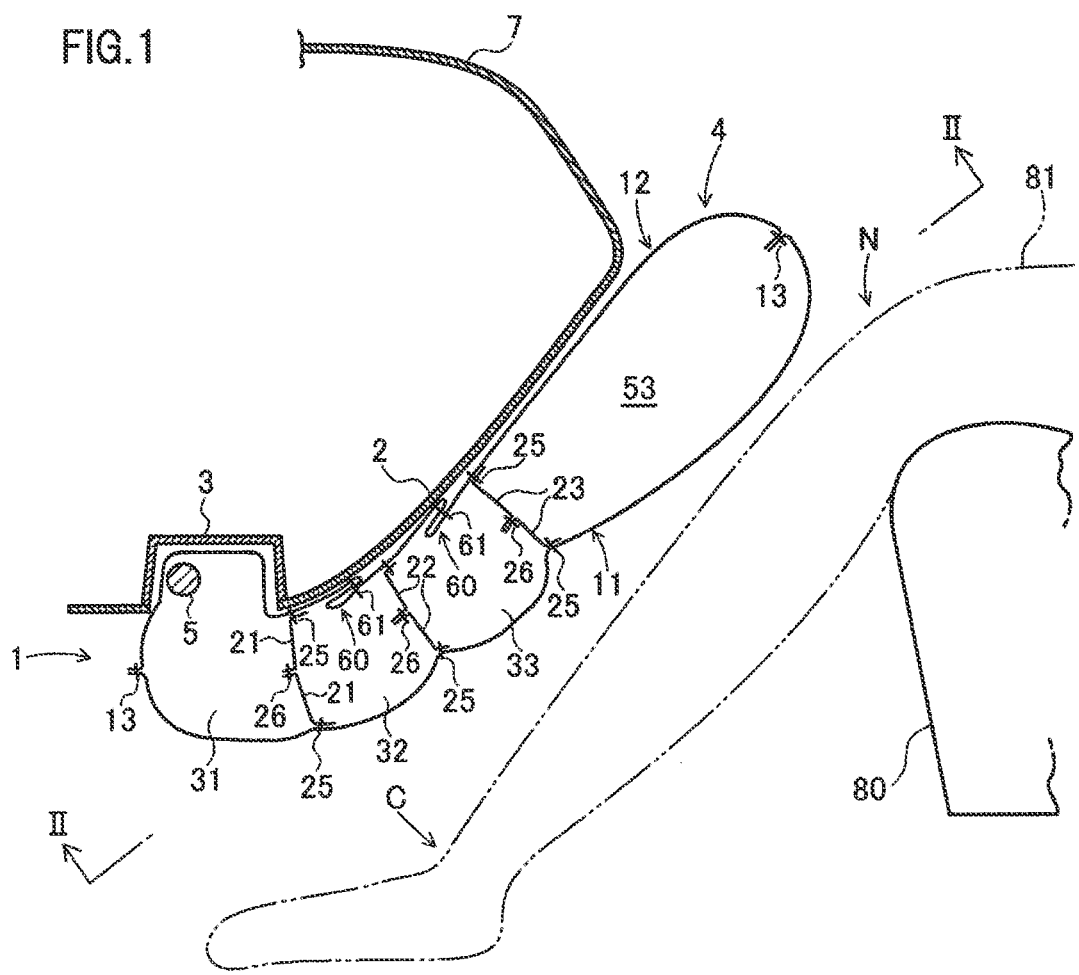
FIG. 1 is a vertical sectional view in the automobile longitudinal direction showing an operating state of an occupant's leg restraint device according to an embodiment.
Figure 2:
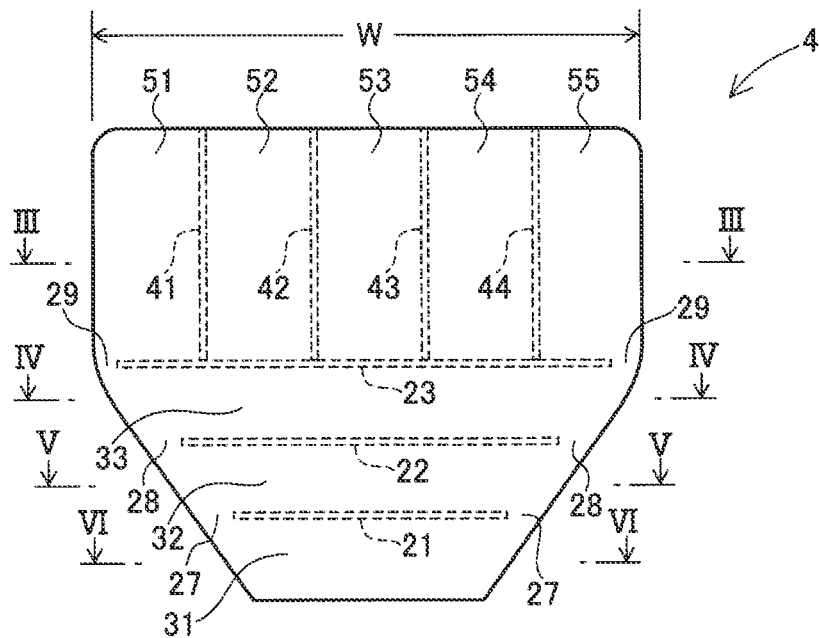
FIG. 2 is a view as seen from line II-II of FIG. 1.
Figure 3:
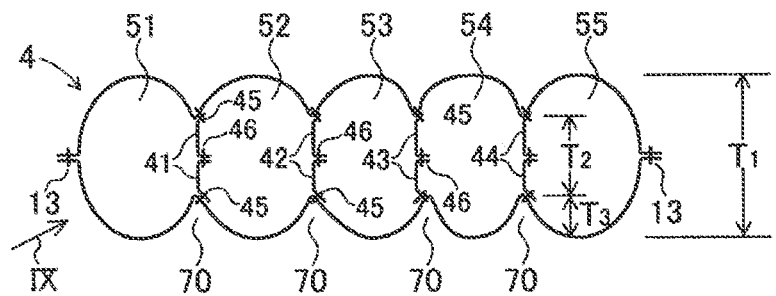
FIG. 3 is a sectional view taken along line III-III of FIG. 2.
Figure 4:
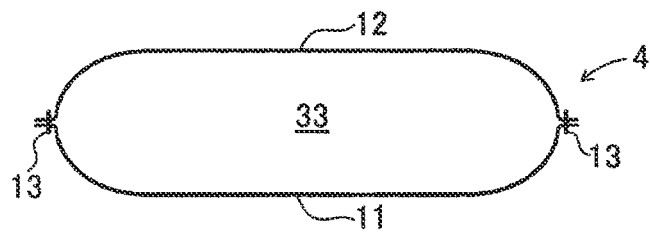
FIG. 4 is a sectional view taken along line IV-IV of FIG. 2.
Figure 5:
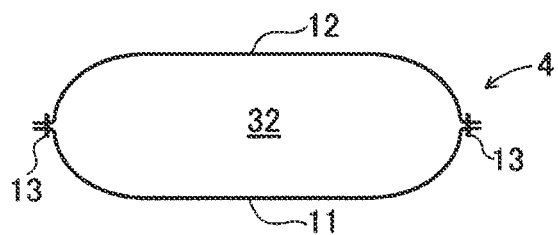
FIG. 5 is a sectional view taken along line V-V of FIG. 2.
Figure 6:
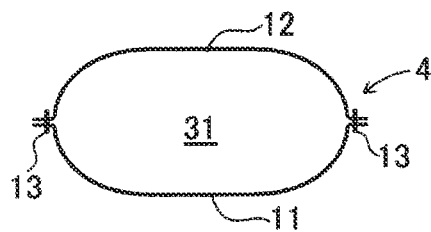
FIG. 6 is a sectional view taken along line VI-VI of FIG. 2.
Figure 7:
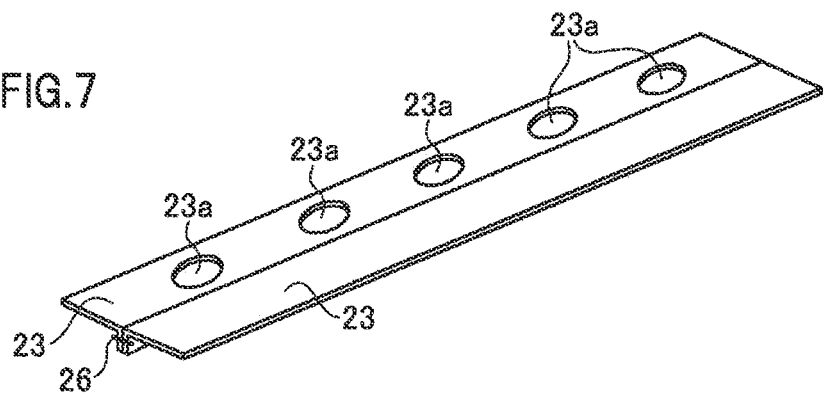
FIG. 7 is a perspective view of a third horizontal separating panel.
Figure 8:
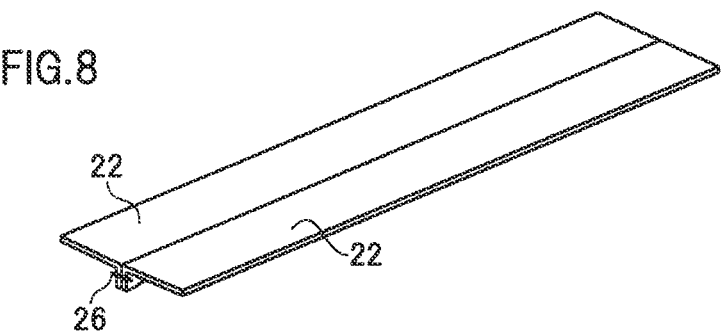
FIG. 8 is a perspective view of a second horizontal separating panel.
Figure 9:
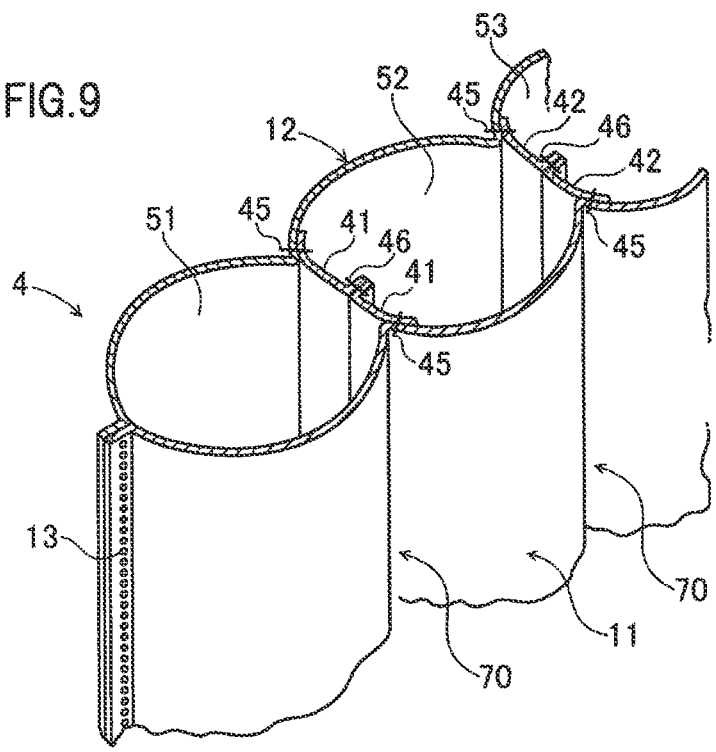
FIG. 9 is a sectional perspective view as seen from IX of FIG. 3.

Embodiments will be described below with reference to FIGS. 1 to 9.

An occupant's leg restraint device 1 according to an embodiment of the present invention is installed in a downward-facing part of an interior board 2 in front of a passenger seat of an automobile. The interior board 2 is installed below a dashboard 7.

The occupant's leg restraint device 1 has a case 3 that is disposed on the back side of the interior board 2, an airbag 4 that is folded and housed in the case 3, and an inflator 5 that inflates the airbag 4. A front surface of the case 3 is covered by a lid (not shown). The lid is provided with a tear line (not shown) that tears when the airbag 4 inflates. The case 3 is fixed to a vehicle body side member with a bracket (not shown) therebetween.

The airbag 4 has a first panel 11 on the occupant side and a second panel 12 on the interior board 2 side. The peripheries of the panels 11, 12 are joined together by a linear sewn portion 13, so that a bag-like shape is formed.

The lower part of the inside of the airbag 4 is divided into horizontally long chambers 31, 32, 33 by first to third separating panels 21, 22, 23 extending in the lateral direction. The chambers 31 to 33 are continuous chambers that are continuous from the left end to the right end of the airbag 4. Although the inflator 5 is placed in the lowermost chamber 31, the inflator may be placed outside the airbag.

The upper part of the inside of the airbag 4 is divided into small chambers 51, 52, 53, 54, 55 by vertical separating panels 41, 42, 43, 44 extending vertically.

One long side parts of the horizontal separating panels 21 to 23 are sewn to the first panel 11 or the second panel 12 with sewing thread 25. The other long side parts of the horizontal separating panels 21 to 23 are sewn together with sewing thread 26. Instead of using two horizontal separating panels joined together as described above, a horizontal separating panel composed of a base fabric, such as the horizontal separating panel 23A of FIG. 10, may be used. The vertical separating panels 41, 42, 43, 44 may also be each a panel composed of a base fabric.

Both lateral ends of the horizontal separating panels 21 to 23 are slightly separated from the left side and the right side of the airbag 4, and spaces 27, 28, 29 for gas flow are provided between both lateral ends of the horizontal separating panels 21 to 23 and both lateral sides of the lower part of the airbag 4.

At least one of the horizontal separating panels 23 is provided with openings 23a that make the uppermost chamber (continuous chamber) 33 communicate with the small chambers 51 to 55. The small chamber 51 farthest to the left and the small chamber 55 farthest to the right communicate with the chamber 33 also through the spaces 29. Only three openings 23a may be provided so that the small chamber 51 farthest to the left and the small chamber 55 farthest to the right communicate with the chamber 33 only through the spaces 29.

One long side parts of the vertical separating panels 41 to 44 are sewn to the first panel 11 or the second panel 12 with sewing thread 45. The other long side parts of the vertical separating panels 41 to 44 are sewn together with sewing thread 46.

In a state where the airbag 4 has inflated, the lower ends of the vertical separating panels 41 to 44 are located at a height about midway between the knee N and the ankle C of an AM50 dummy 81 seated in a seat 80. Specifically, the horizontal separating panel 23 is preferably located within a range of ±100 mm, more preferably ±50 mm vertically from the midpoint between the knee N and the ankle C.

In this embodiment, a tuck portion 60 is formed in each of parts of the second panel 12 on the interior board 2 side that face the second and third chambers 32, 33 from the bottom. The tuck portion 60 is formed by tucking the second panel 12 and sewing the tucked parts with sewing thread 61.

The airbag 4 may also be provided with a vent hole.

When an automobile equipped with the occupant's leg restraint device 1 thus configured has a collision, the inflator 5 is actuated, gas is ejected, and the airbag 4 starts inflating. As the airbag 4 starts inflating, the lid is opened, and the airbag 4 expands into the vehicle cabin and deploys upward along the front surface of the interior board 2.

In the occupant's leg restraint device 1, the lower part of the inside of the airbag 4 is divided into the chambers 31 to 33, and the lowermost chamber 31 starts inflating first. In this case, almost all of the gas pressure acts as the inflation pressure of the chamber 31, and the chamber 31 inflates quickly. After the inflation of the chamber 31, the chambers 32, 33 inflate sequentially along the interior board 2.

The horizontal separating panels 21 to 23 that define the chambers 31 to 33 extend linearly in the lateral direction, and the lower part of the airbag 4 inflates quickly in the lateral direction.

In this embodiment, because the lateral width of the lower part of the airbag 4 is smaller than the lateral width of the upper part, the lower part of the airbag 4 inflates early.

In this embodiment, since the tuck portions 60 are provided on the interior board 2 side of the lower part of the airbag 4, the airbag 4 inflates so as to curve along the interior board 2.

The gas in the chamber 33 is supplied through the spaces 29 and the openings 23a to the small chambers 51 to 55, and the small chambers 51 to 55 inflate. The airbag 4 inflates and deploys to slightly above the knees of the passenger. The legs of the passenger are restrained by the thus inflated airbag 4.

In this embodiment, the upper part of the airbag 4 is divided into the small chambers 51 to 55 by the vertical separating panels 41 to 44. In the parts of the vertical separating panels 41 to 44, the inflated thickness $T_2$ of the airbag 4 is small compared to the maximum inflated thickness $T_1$ of the small chambers 51 to 55. Therefore, on the occupant side of the airbag 4, recessed portions 70 (FIGS. 3, 9) are formed along the vertical separating panels 41 to 44. Because the knees N of the occupant engage with the recessed portions 70, the lateral movement of the knees N is restrained. Therefore, when the automobile has an oblique collision or an offset barrier collision, the knees N is prevented from moving diagonally forward.

The depth $T_3$ of the recessed portions 70 is preferably about 10 to 60 mm, more preferably about 20 to 40 mm. The maximum inflated thickness $T_1$ of the small chambers 51 to 55 is preferably about 80 to 120 mm, more preferably about 90 to 110 mm.

While five small chambers 51 to 55 are formed in the upper part of the airbag 4 by the vertical separating panels 41 to 44 in the above-described embodiment, the number of small chambers is preferably 4 to 8, more preferably 4 to 6.

While three chambers (continuous chambers) 31 to 33 are formed in the lower part of the airbag 4 by the three horizontal separating panels 21 to 23 in the above-described embodiment, the number of the continuous chambers may be 1, 2, or 4 or more. The number of continuous chambers is preferably 3 to 5.

Although the case 3 is provided in the downward-facing surface of the interior board 2 in the above-described embodiment, the case 3 may be provided nearer to the seat 80 than it.

Although the first panel 11 and the second panel 12 are separate in the above-described embodiment, the first panel and the second panel may be one half and the other half of a double-folded panel.

In the present invention, some of the horizontal separating panels 21 to 23 may be replaced not by panels but by linear joint portions at which the panels 11, 12 are directly sewn together.

The occupant's leg restraint device of the present invention may be installed in front of a passenger seat or in front of a driver seat.

The above description is an example of the present invention, and the present invention may be in the form other than the above.

Although the present invention has been described in detail with regard to specific embodiments, it will be apparent to those skilled in the art that various modifications may be made without departing from the spirit and the scope of the present invention.

This application is based on Japanese Patent Application No. 2014-167641 filed on Aug. 20, 2014, the entire content of which is hereby incorporated by reference.

The invention claimed is:

1. An occupant's leg restraint device comprising:
an airbag that inflates in front of legs of an occupant in a front seat of an automobile; and
an inflator for supplying gas to a lower part of the airbag to inflate the airbag,
the airbag having a first panel on an occupant side and a second panel on a side opposite thereto,
wherein an upper part of an inside of the airbag is divided into four or more small chambers by vertical separating panels that are joined to the first panel and the second panel and that extend vertically,
wherein the four or more small chambers are sequentially provided in a lateral direction,
wherein the lower part of the inside of the airbag is divided into chambers by a horizontal separating panel extending in the lateral direction of the airbag,
wherein below the four or more small chambers there is a first continuous chamber that is continuous from a left end side to a right end side of the airbag, and
wherein below the first continuous chamber there is a second continuous chamber that is continuous from the left end side to the right end side of the airbag.

2. The occupant's leg restraint device according to claim 1, wherein in a state where the airbag has inflated, the lower ends of the vertical separating panels are located about midway between knee and the ankles of an AM50 dummy.

3. The occupant's leg restraint device according to claim 1, wherein the number of the small chambers is 4 to 6.

4. The occupant's leg restraint device according to claim 1,
wherein the small chambers and the first continuous chamber are separated by a horizontal separating panel extending in the lateral direction of the airbag, and
gas can flow from the first continuous chamber into the small chambers through openings provided in the horizontal separating panel.

5. The occupant's leg restraint device according to claim 1, wherein in a state where the airbag has inflated, recessed portions having a depth of 20 to 40 mm are formed in the occupant-side surface of the airbag along the vertical separating panels.

6. An airbag used in an occupant's leg restraint device, comprising a first panel on the occupant side and a second panel on the side opposite thereto,
wherein an upper part of an inside of the airbag is divided into four or more small chambers by vertical separating panels that are joined to the first panel and the second panel and that extend vertically,
wherein the four or more small chambers are sequentially provided in a lateral direction,
wherein a lower part of the inside of the airbag is divided into chambers by a horizontal separating panel extending in the lateral direction of the airbag,
wherein below the four or more small chambers there is a first continuous chamber that is continuous from a left end side to a right end side of the airbag, and
wherein below the first continuous chamber there is a second continuous chamber that is continuous from the left end side to the right end side of the airbag.

* * * * *